US007139822B2

(12) United States Patent
Guenther et al.

(10) Patent No.: US 7,139,822 B2
(45) Date of Patent: Nov. 21, 2006

(54) INTERCEPTION METHOD AND SYSTEM FOR COMPENSATING DISADVANTAGEOUS CHARACTERISTICS OF A COMMUNICATION PROTOCOL

(75) Inventors: Ludwig Guenther, Alsbach (DE); Tzvetan Petrov, Heidelberg (BG); Dirk Sabiwalsky, Eppelheim (DE)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 09/855,360

(22) Filed: May 15, 2001

(65) Prior Publication Data

US 2002/0004834 A1    Jan. 10, 2002

(30) Foreign Application Priority Data

Jul. 7, 2000    (EP)    ................... 00114613

(51) Int. Cl.
*G06F 15/173* (2006.01)
*G06F 15/16* (2006.01)

(52) U.S. Cl. ............... 709/224; 709/227; 709/229

(58) Field of Classification Search ............... 709/227, 709/229, 201; 370/232, 389, 410
See application file for complete search history.

(56) References Cited

U.S. PATENT DOCUMENTS

| | | | | |
|---|---|---|---|---|
| 5,265,091 A * | 11/1993 | van Landegem | ............... | 370/232 |
| 5,673,322 A | 9/1997 | Pepe et al. | ............... | 380/49 |
| 5,790,800 A * | 8/1998 | Gauvin et al. | ............... | 709/227 |
| 5,903,851 A * | 5/1999 | Backstrom et al. | ............... | 455/557 |
| 6,105,067 A * | 8/2000 | Batra | ............... | 709/227 |
| 6,356,622 B1 * | 3/2002 | Hassell et al. | ............... | 379/1.01 |
| 6,412,006 B1 * | 6/2002 | Naudus | ............... | 709/227 |
| 6,570,881 B1 * | 5/2003 | Wils et al. | ............... | 370/410 |
| 6,618,819 B1 * | 9/2003 | Adamovits et al. | ............... | 714/13 |
| 6,661,787 B1 * | 12/2003 | O'Connell et al. | ............... | 370/389 |
| 6,662,206 B1 * | 12/2003 | Banavar et al. | ............... | 709/201 |
| 6,671,729 B1 * | 12/2003 | Gordon et al. | ............... | 709/227 |
| 2002/0015392 A1 * | 2/2002 | Musikka et al. | ............... | 370/331 |

FOREIGN PATENT DOCUMENTS

JP    10-320322    12/1998

OTHER PUBLICATIONS

Hansen, J. S. et al. "Dynamic Adaption of Network Connections in Mobile Environments", IEEE Internet Computing, Jan./Feb. 1998, pp. 39-47.
Floyd, R. et al. "Mobile Web Access Using eNetwork Web Express", IEEE Personal Communications, IEEE Communications Society, US, vol. 5, No. 5, pp. 47-52 Oct. 1, 1998.
Hansen, J. et al. "Semi-Connected TCP/IP in a Mobile Computing Environment", Workshop IMC. Information Visualization and Mobile Computing, Proceedings of IMC, vol. 1, No. 2, pp. 39-48, 1998.

* cited by examiner

*Primary Examiner*—William Vaughn
*Assistant Examiner*—Kenny Lin
(74) *Attorney, Agent, or Firm*—Schmeiser, Olsen & Watts; John R. Pivnichny

(57) ABSTRACT

Means and method of data communication compensating disadvantageous characteristics of a first protocol for data communication between a client-application and a server-application. Communication requests of the client application and the server application adhering to a second protocol are intercepted by an client interceptor and a server interceptor. Besides mapping the second protocol onto the first protocol and back again the interceptors compensate disadvantageous characteristics inherent to the first protocol or arising from the combination of protocols transparently.

22 Claims, 6 Drawing Sheets

INTERCEPTION METHOD AND SYSTEM FOR COMPENSATING DISADVANTAGEOUS CHARACTERISTICS OF A COMMUNICATION PROTOCOL

FIELD OF THE INVENTION

The present invention relates to a method and corresponding means for communication between computer systems and/or pervasive computing devices. More particularly the current invention relates to compensation for disadvantageous characteristics of a communication protocol in situations where the communication protocol itself cannot be replaced.

BACKGROUND

The present invention deals with the handling of disadvantages of a communication protocol. Such disadvantages (as it will be seen later) are inherent to many types of communication protocols. As wireless communication protocols are the most prominent and well-known protocols reflecting such disadvantages, the current description will concentrate on wireless communication protocols. Nevertheless, the same or similar disadvantages may be found in other types of communication protocols; of course the present invention may be applied to these communication protocols as well. The invention is independent from the communication protocol it is applied to.

For several years industry watchers have been forecasting an explosion in wireless Internet usage. With more than 200 million Internet users and more than 400 million mobile subscribers in the marketplace there is every reason to believe that this industry, as it grows, will have a dramatic impact on the way we access information.

The mobile communications marketplace continues to expand explosively, with potential revenue growth supported by an ever-increasing variety of new services and new target segments. Each of these new services and segments bring with it fresh challenges for business activities outside traditional office settings. The wireless Internet allows businesses to deliver new types of services, including both internal services like sales automation and document management; and external services like travel reservations, stock trading, information selling—faster and easier than ever before. Mobile data communication will set new business standards for timely access to people and information. Managers, business partners, and account executives-all of whom are expected to spend more of their time in the field-will profit from remote access to enterprise networks.

Mobile data communication and its increasing acceptance by users will substantially influence the advancement of the terrestrial network. Apart from the infrastructural effects, which result from the spreading of mobile radio data transmission networks, there are special problems such as:

1. Low bandwidth and transmission speed—the transmission bandwidth of radio data transmission services remains far behind that of stationary networks.

2. High costs—transmission costs over wireless communication networks are much higher than the costs over stationary networks.

3. High complexity—in a dynamic architecture, logical connections must be mapped on different physical structures.

4. Low reliability—wireless connections are significantly less reliable then wireline connections.

5. High latency—the response time for wireless links is much slower than that of terrestrial links.

6. High connection overhead—each data request for a TCP/IP based server requires the client part to open an TCP/IP socket. The consequences are to intensify the data overhead and to increase the latency.

A wide variety of problems may arise up when wireless communication terminals send and receive signals over the air. The signals of all the terminals are subject to mutual interference. The characteristics of the propagation medium change randomly as users move, and the mobile radio channel introduces random variation in the received signal power and other distortions, such as frequency shifts and the spreading of signals over time. Signals that travel over the air are also more vulnerable to jamming and interception than are those transmitted through wires or fibers. As a result, transmitted data packets may be lost. These limitations are often addressed with a combination of sophisticated signal processing techniques and antennas, but there is no comprehensive software based solution. However, these solutions add to the complexity of wireless networks and increase power requirements.

Many of these shortcomings may be attributed to limited bandwidth, which additionally drives up the costs of wireless data links. At present, transmission speed is limited to 9600 Bit/s. This limitation is inherent to GSM (Global System for Mobile communication), which transfers only approximately 13 kBit/s per channel. There have been attempts to moderate these disadvantages. The GSM phase II standard specified a data mode supporting 14.4 kBit/s. But the increased rate comes at the expense of Forward Error Correction, and therefore lowers the quality of the connections. Fundamentally GSM was not designed for mobile Internet access, and even a 14.4 kBit/s data rate offers only a small improvement.

In contrast to other areas of information technology, wireless communications has yet to converge to a single technical standard or even a very small number of them. Instead it appears that diversity will endure for the foreseeable future. As long as this technical standard is not available, other ways must be investigated (perhaps based on software solutions), to provide a solution to the above problems.

A further dimension of the problem is introduced by the use of TCP/IP over wireless networks. Such a combination of a first and a second protocol is sometimes inevitable. The first protocol, TCP/IP, has to be used because it is simply the established protocol of the Internet; on the other hand the second protocol, the wireless communication protocol, must be used due to the specific communication environment for which there is no other protocol available for substitution. In such situations one might be confronted with the problem of how to deal with disadvantageous characteristics of a certain protocol which either might be inherent to the protocol itself or which might be the result of combining two protocols.

In the current situation of TCP/IP over wireless networks, high delay and variation in data loss result in unacceptable performance for many standard multimedia applications and reliable protocols such as TCP/IP. Both multimedia applications and reliable protocols adapt to long term end-to-end estimates of delay and packet loss between the data source and destination. However, they do not perform well when rapid variations in network characteristics occur, causing high fluctuations in these estimates. In order for these applications and protocols to achieve good performance, the protocol for transmitting data to mobile hosts must provide communication with reliable connections and negligible data loss (which is not the case for wireless communication protocols).

Typically, wireless Internet access works in the same way as network access using fixed data modems. Usually the mobile terminal (a combination of Notebook and wireless data phone) calls a fixed network modem placed on the ISP (Internet Service Provider) side. Thereby it make use of the Point-to-Point (PPP) (RFC1662) or the SLIP(RFC1055) in order to enable TCP/IP over phone lines (additionally there are proprietary solutions of individual portable radio network carriers). But both PPP and SLIP are not very well suited for unreliable radio connections because of transmission overhead. There is a certain amount of transmission overhead associated with maintaining timers, scheduling processes, and specific protocol control data.

IP (Internet Protocol) is a connectionless packet-oriented protocol of the network layer of the OSI reference model. In the transport layer usually TCP (transport control protocol) is applied. TCP uses IP. TCP is a connection-oriented and reliable protocol, including error recognition and correction, flow control, avoidance of congestion in routers, and fairness among network components. The TCP protocol transfers data complete and without errors. The price is slower transmission over error susceptible channels. But by using a perfected windowing technique, TCP minimizes this price. A sliding window allows TCP to send several data segments and await their acknowledgment. As soon as an acknowledgment is received, the window is shifted and another segment can be sent. For every sent segment TCP starts a separate timer, which possibly signals a missing acknowledgment and initiates a retransmission of the segment. With the help of Congestion Avoidance, Multiplicative Decrease, and Slow Start, TCP adapts to the network condition and avoids an overload of the network.

Today's networks offer very low error rates (~10–6). The TCP mechanisms are therefore designed for wired networks with low error rates. A typical wireless network can't provide such good transmission quality and small delays. Moreover the lower OSI layers for wireless networks use techniques for error recognition and correction, which increase the delays. TCP may interpret such delays as evidence of congestion. While the perfected mechanisms of the wireless network layers provide a faultless transmission, TCP timers expire and initiate retransmissions. These timers are adapted dynamically by measuring the round trip time. A new time is only taken when an acknowledgment is received for a segment, which has not yet been retransmitted. After a period of error-free transmission the timers are accordingly short.

If there is a short phase of disturbance or poor transmission conditions, however, the error correction mechanisms of the wireless network layers cause longer delays and thereby longer TCP round trip times. TCP reacts with expiring timers and unnecessary retransmissions. TCP always interprets expired times (or data loss) as a sign of congestion. The effects are longer timers and a reduction of size of the sliding window which causes a drop in transmission rate. Even when the transmission in the network recovers, TCP still needs some time to adapt its timers to this condition.

Since TCP interprets all acknowledge delays as congestion, it can't react correctly in these situations which are typical to a wireless network. So TCP is not the optimal protocol for transferring data in wireless networks. Thus there is a need for a way of compensating for disadvantageous characteristics of a communication protocol in situations where the communication protocol itself cannot be replaced.

SUMMARY OF THE INVENTION

The present invention relates to means and a method of data communication compensating disadvantageous characteristics of a first protocol for data communication between a client application and a server application.

Communication requests of the client application and the server application adhering to a second protocol are intercepted by an client Interceptor and a server Interceptor. Besides mapping the second protocol onto the first protocol and back again the Interceptors transparently compensate disadvantageous characteristics inherent to the first protocol or arising from the combination of protocols.

In modern interconnected computer environments, developers of applications very often are not free in selecting the type of communication protocol. For instance, to participate in the Internet most applications are required to exploit the TCP/IP protocol. On the other hand a technology explosion with respect to mobile and pervasive computing devices is ongoing. With these new computing devices new types of lower level communication protocols must be handled to interconnect with these devices. Very often the straight forward approach of communicating via TCP/IP directly over these lower level protocols introduces the above mentioned deficiencies. The Interceptor approach of the current invention provides an efficient way of compensating for these deficiencies transparently.

DETAILED DESCRIPTION OF THE INVENTION

Figure 1:
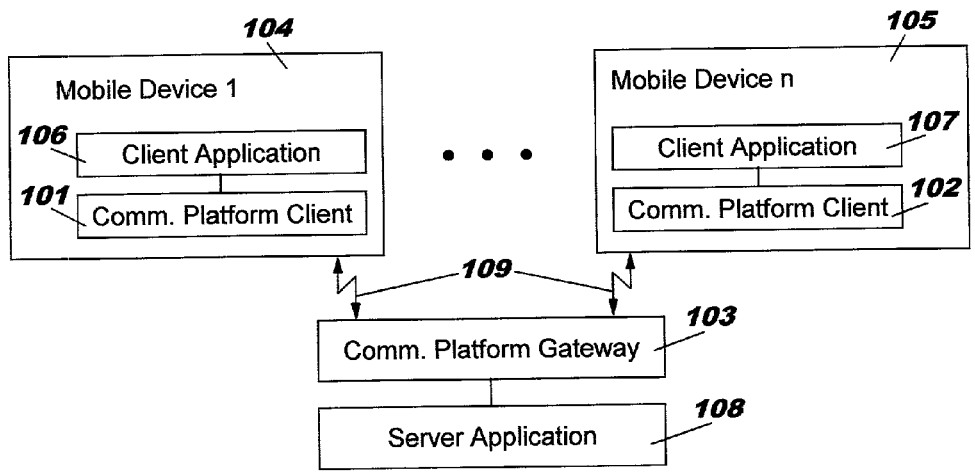
FIG. 1 shows a typical state- of- the art situation which gives rise to the above mentioned problems.

In the drawings and specification there is set forth a preferred embodiment of the invention and, although specific terms are used, the description thus given uses terminology in a generic and descriptive sense only and not for purposes of limitation.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The current invention is illustrated based on the example of a wireless communication protocol and the TCP/IP protocol as representatives of a first and second protocol. Nevertheless the current invention is completely independent from the specific type of protocol being used and thus can be applied to other protocols as well.

Introduction and Overview of the Proposed Interceptor

FIG. 1 shows a typical state of the art situation which gives rise to above mentioned problems.

The communication platform 101, 102, 103 enables mobile client devices 104 to 105 to exchange data with a stationary gateway component 103 using wireless radio networks 109 (e.g. the GSM network). The communication platform ensures a reliable and efficient transmission of the data. It provides crash recovery to reestablish broken down connections and shorthold mode to minimize the costs. It compresses the data to speed up transmission, which also has positive effect on the costs.

The communication platform client offers a client application 106 and 107 on every mobile device the ability to communicate with a server 108, which is connected to the communication platform gateway. Only one server application can be connected to the communication platform gateway at a time. Multiple mobile devices can be connected simultaneously to the communication gateway, so multiple client applications can communicate with this server application.

Despite all of the problems mentioned, which arise in the situation depicted in FIG. 1, digital data connections from GSM-equipped PCs to corporate data centers offer new levels of mobility to remote access users. The Interceptor solution as proposed by the current invention exploits this facility and complements it to overcome some inherent disadvantages of GSM data—high cost, unreliable connections, restricted bandwidth and exposure to loss of confidentiality and integrity.

The Interceptor applies an interception mechanism in order to improve the transmission qualities of the wireless connection and compensate for certain disadvantageous characteristics of the wireless communication protocol.

Figure 2:
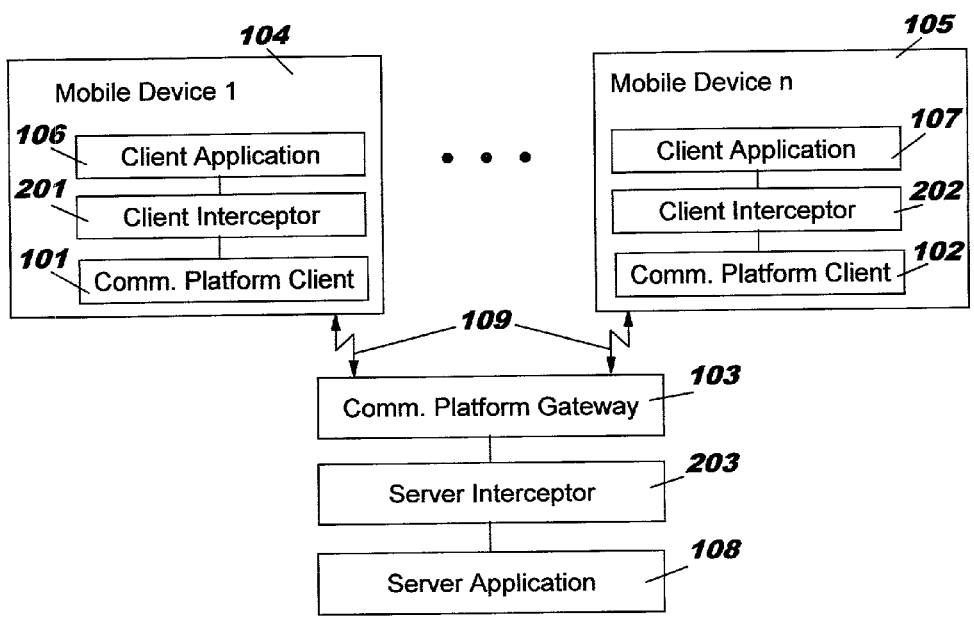
FIG. 2 shows in a contrasting manner with respect to FIG. 1 how and where the proposed intercepting mechanism may be used.

FIG. 2 shows in a contrasting manner with respect to FIG. 1 how and where the proposed intercepting mechanism, represented by a client Interceptor 201 and 202 and a server Interceptor 203, may be used.

With the interception mechanism, the Interceptor is not aware of the existing applications. All outgoing TCP/IP connections are intercepted transparently on client and server sides using low-level interception mechanisms; they are then passed to the communication part that forwards them using wireless transmission features. This approach does not require any modification to the TCP/IP stack, but relies on operating system specific mechanisms for request interception. In this way the aim could be obtained very efficiently without the need for changes in the TCP/IP based client/server application. This high performance system consists of two basic elements, an embedded component for transparent interception of TCP/IP requests and a mobile communication platform. The Interceptor uses both components that run on the client and on the server side for the protocol replacement and optimization, or in general for compensation of deficiencies of the underlying wireless communication protocol. The mobile communication platform makes type and behavior of a physical wireless network transparent to applications. This software component can be applied to different kinds of cellular radio networks and is in a state in which it meets or exceeds the expected bandwidth avoidance and decreased TCP/IP access times associated with any wireless network.

The Interceptor makes it possible to configure the way a client and its server exchange data to meet special requirements. The traffic can either be connection-oriented or connectionless; or in other words the present invention can be applied to both classes of protocols. In case of a connection-oriented protocol the following functionalities may be embodied into the Interceptor for compensating disadvantageous characteristics of the underlying protocol:

1. Scalability

The enterprise environment may be configured in a variety of topologies to meet the needs of specific applications and installations. Various cellular radio networks may be used at the same time by the Interceptor.

2. Reliability

All data is transmitted unchanged and without any loss. During mobile calls, disconnections can happen at unexpected times—for example when entering a tunnel while downloading a document. The Interceptor has an excellent mobile resilience and holds the session in a special logical off-line mode until reconnection can be effected by automatic retry.

3. Shorthold Mode

Shorthold Mode means that it is no longer necessary to hold up the call during idle periods: the Interceptor detects these idle periods and drops the call, reconnecting automatically when there is more traffic. This mode can cut call costs significantly.

4. Replacing TCP/IP by Wireless Optimized Transport Protocol The outgoing TCP/IP data stream is intercepted. All requests are routed over one wireless connection to avoid the costly connection establishment overhead. Requests and responses are multiplexed over this connection. The wireless connection uses an optimized proprietary protocol in order to reduce the data traffic. Thus the Interceptor instance multiplexes N connections over a single wireless protocol connection realizing an N-to-one connection mapping.

5. Authentication

The client must authenticate at the gateway before data transmission. As the user's session is maintained over potential disconnections (intentional or otherwise), a security level is essential. It is vital to prevent one user from connecting to another's off-line or short-hold disconnected session. The Interceptor security approach ensures that this cannot happen based on a corresponding functionality.

6. Compression

The data traffic is compressed using the V42bis algorithm to speed up the transfers and to reduce costs. In other words, the Interceptor also may make use of specific compression algorithms.

As already indicated above the Interceptor approach is not limited to connection-oriented protocols (between the client Interceptor and the server Interceptor). For instance to reduce transmission costs, the Interceptor supports in addition connectionless radio networks in the same way.

Interceptor Architecture

Figure 3:
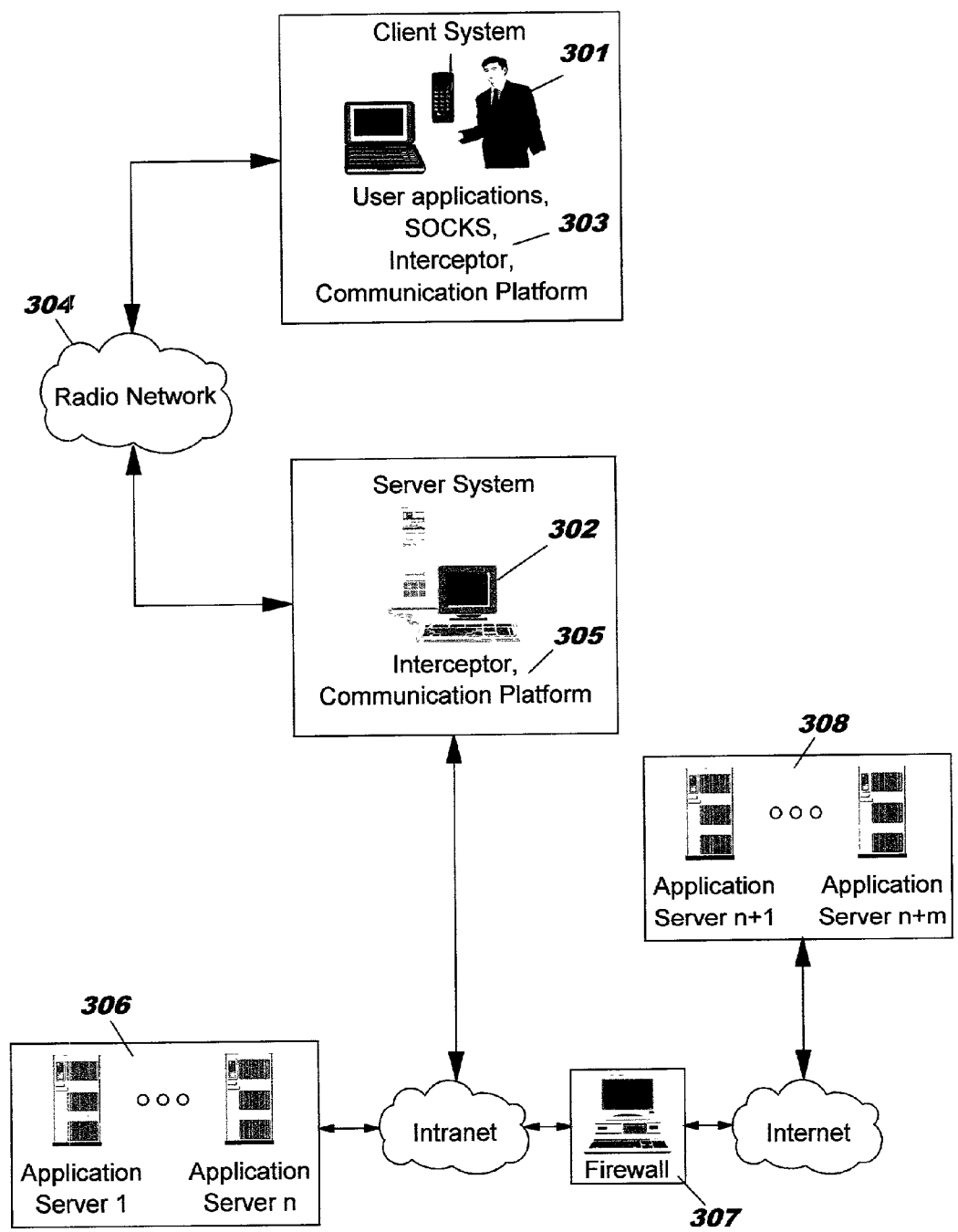
FIG. 3 shows an overall situation in which the proposed Interceptor technology can be exploited beneficially.

FIG. 3 shows an overall situation in which the proposed Interceptor technology may be exploited beneficially. This may be viewed as a typical scenario for using the Interceptor. The mobile user represented by the client system 301 (being represented for instance by a mobile computer or a mobile phone) may use various TCP/IP based applications. Examples of such applications are Internet browsers using HTTP, e-mail programs using SMTP, news using NNTP, terminal emulation programs using TELNET or Lotus Notes using a proprietary protocol. The corresponding application server 302 can be part of the intranet or the Internet.

Beside the user applications, the client system consists of the client parts of SOCKS, Interceptor 303 and the communication platform. The SOCKS client is used to redirect all outgoing TCP/IP connections to the Interceptor client. The Interceptor client receives all data sent by the user application over such a TCP/IP connection and transmits them over the Radio Network 304 using the communication platform client. Data received by the communication platform from the Radio Network is transferred to the appropriate user application via the Interceptor client.

The Server System comprises the counterparts of the Interceptor client and communications platform client, namely the Interceptor server 305 and communication platform server. The data sent by the Client System over the Radio Network are received by the communication platform server which delivers them to the Interceptor server. Knowing the IP address and port of the destination the Interceptor server sends the data to the corresponding application server over a TCP/IP connection. And vice versa, data sent by the application server over the TCP/IP connection to the Interceptor server are transmitted to the Client System over the Radio Network using the communication platform server. In the scenario depicted in FIG. 3 the potential application server 306 may be some server or within the Internet; without deviating from the current teaching the application server may also be located within a private intranet behind some type of firewall 307 as visualized by the application servers 308.

This architectural view nicely reflects the peculiar relationship between client application, client Interceptor, server application and server Interceptor. From the perspective of the client application the client Interceptor is pretending to represent the server application. If the client application and the client Interceptor reside on the same (mobile or pervasive) computing device, as in the current case, bound by a TCP/IP connection (being based on the assumption of a reliable communication media), this connection will not be subject of any disturbance. The present invention may be applied as well to a situation where the client application and the client Interceptor reside on different computing devices; but the greatest advantages are achieved if both instances reside on the same computing device as in this case vulnerability of the TCP/IP connection is reduced to the largest extent. From the perspective of the server application the server Interceptor is pretending to represent the client application. The greatest benefits are achieved if the server Interceptor resides on this computing system, which represents the end point of the unreliable connection (via radio network in the current case). In a typical environment the server applications will reside on computing systems different to that computing system which hosts the server Interceptor; but of course it is not excluded that the server Interceptor and the server application share the same computing system.

Figure 4:
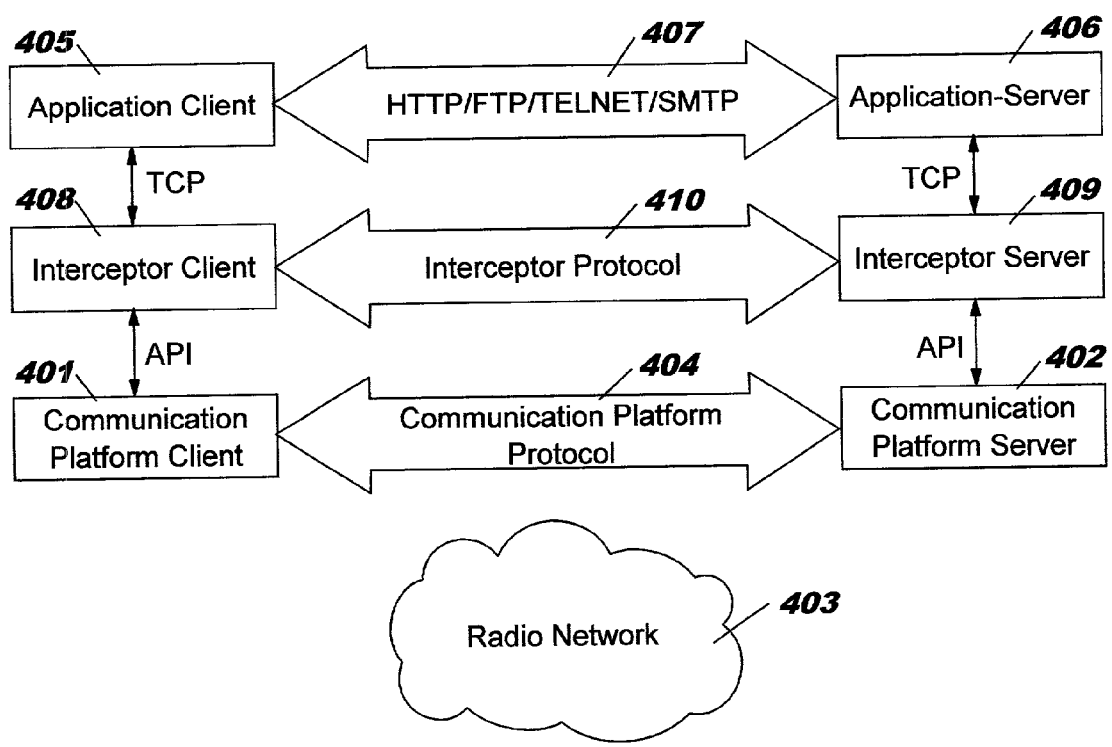
FIG. 4 shows the system architecture of the Interceptor solution in a layering model.

FIG. 4 shows the system architecture of the Interceptor solution in a layering model. The communication platform on the client system 401 is connected to the communication platform on the server system 402 over a first protocol, a wireless radio network 403 in the current example. From a logical perspective this enables a communication 404 between the two communication platforms. According to the state of the art the client application 405 would set up a TCP/IP connection (the second protocol) over the communication platform with its application server 406. This would establish a logical communication connection 407 between application client and application server.

In contrast to the state of the art, the current teaching introduces two new instances, the client Interceptor 408 and the server Interceptor 409. If the client application attempts to set up a connection based on the second protocol (the TCP/IP protocol) to the server application, then actually a connection with the client Interceptor will be established. In a certain sense the client Interceptor pretends to represent the server application with respect to the client application. The client Interceptor intercepts all communication requests of the client application and maps these requests from the second protocol (TCP/IP) onto the first protocol (unreliable, wireless radio network); it then communicates over the communication platform to its counterpart, the server Interceptor. By means of this logical Interceptor-to-Interceptor communication 410 the basis has been created to compensate for deficiencies of the first protocol. The server Interceptor will then set up a connection to the server application and will perform the reverse mapping from the first protocol to the second protocol. Due to its intercepting behavior the server Interceptor pretends to represent the client application with respect to the server application.

Figure 5:
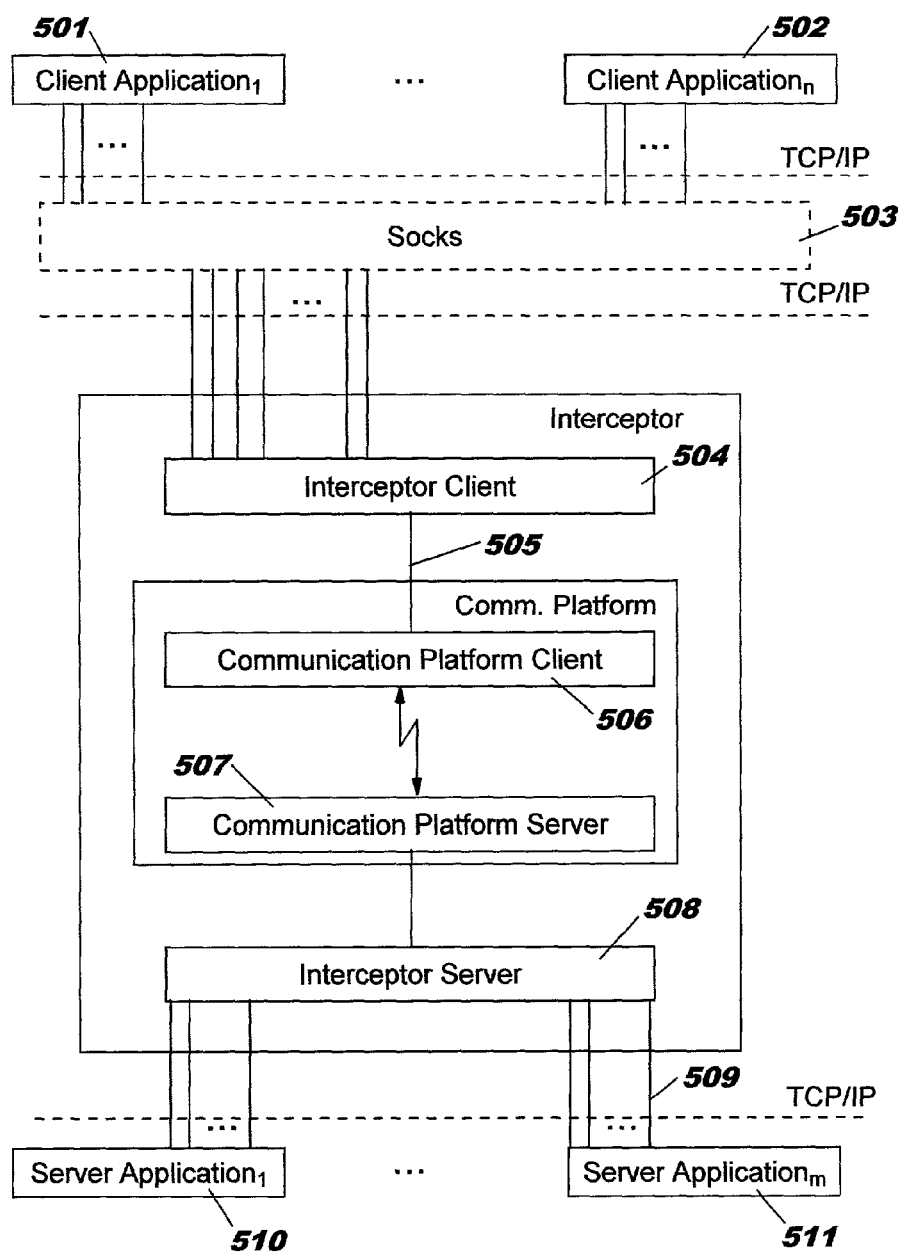
FIG. 5 shows a more modular view of the Interceptor architecture of FIG. 4.

The Interceptor architecture of FIG. 4 is also represented within FIG. 5, but now making use of more modular view. Also referring to the description of FIG. 4, FIG. 5 represents:

Client applications 501 up to 502,
issuing communication requests over of second protocol 503,
the client Interceptor 504, intercepting these communication requests, and mapping these communication requests onto a first protocol 505,
the communication platform client and server 506 and 507 communicating via this first protocol,
the server Interceptor 508 executing the reverse mapping between the first and the second protocol 509, and
the server applications 510 up to 511.

In the example of FIG. 5 the Interceptor consists of a mobile (client) and a stationary (server) part.

Interception Architecture and Various Communication Protocols

1. The standard LAN client/server scenario using TCP/IP connections

In this scenario client applications communicate with server applications using TCP/IP connections. Both partners may initiate connections or listen for incoming connections. The characteristics of the local area network meet the design goals of the TCP protocol. Thus application of the interception architecture in such an environment will not achieve the full spectrum of advantages. For instance, the advantage of increased reliability (as described above) will not be achieved in a mere LAN environment.

2. The wireless scenario in a connection-oriented radio network (e.g. GSM bearer service)

In the GSM network, connections for data transfer can be created by dialing a telephone number. The GSM telephones, which are able to transfer data, usually provide a Hayes-compatible interface to a computer, like a modem. So standard implementations of the PPP protocol (see RFC 1661) can be used to connect a computer to a LAN via the GSM network.

Significant deficiencies adhere to such environments. These characteristics of the GSM network and other connection oriented radio networks necessitate solutions other than PPP (Point-to-Point protocol):

- radio networks today offer only slow data transfer rates (usually 9600 bit/second)
- depending on the radio coverage, the speed of the data transmission may be much slower
- a data connection is lost if there is no more radio coverage
- when the mobile computer is moving, its radio coverage may change rapidly and permanently These characteristics result in the following problems with PPP:

- once the data connection is lost, all existing TCP/IP connections are closed
- the TCP timeout-mechanisms are not designed for networks with such varying transmission speed and turn-around times (see RFC 813)

The present invention provides an attractive solution to these problems. Due to the Interceptor technology adapted to the special characteristics of the wireless network, the above mentioned problems are bypassed.

- Broken data connections on the network layer are reestablished without effect on existing TCP/IP connections
- The TCP protocol is not used on the wireless link, instead the communication platform uses a protocol with adjusted timeout-mechanisms The solution is transparent to the client and server applications in that they still use their old TCP/IP interface. By means of the Interceptor component, which catches the TCP/IP traffic (using SOCKS) and transfers it using the communication platform, already existing client and server applications may benefit from the invention without any adaptation effort directed to these applications; in other words, existing applications can exploit the current teaching transparently. To give some further examples, the following protocols can be handled by the Interceptor technology: http (see RFC 2068), SMTP (Internet Mail, see RFC 821), NNTP (Internet News, see RFC 977) and of course many more.

3. SOCKS

In a preferred embodiment the current invention exploits the SOCKS protocol (see RFC 1928) to catch all the TCP/IP connections a client application opens with a server application. Usually the SOCKS protocol is used to establish TCP/IP connections over a firewall. A SOCKS client redirects opening TCP/IP connections to a SOCKS server. The first bytes transferred over a new connection tell the SOCKS server the IP address and the remote port the client application originally used when opening the connection. So the SOCKS server can open a second TCP/IP connection with this IP address and remote port and forward the traffic of each of the TCP/IP connections to its counterpart.

The Interceptor client acts as a SOCKS server; this allows the client Interceptor to pretend to represent the corresponding server application. A SOCKS client must be installed on the mobile computer to redirect all outgoing TCP/IP connections (except "localloop"-connections) to the Interceptor client ("localhost", IP address 127.0.0.1). SOCKS clients are available for almost every operating system.

Interception, Connection Handling and Name Resolution

The Interceptor client and the Interceptor server communicate using the communication platform. Every time a client application tries to open a TCP/IP connection with a server application, the connection is redirected to the Interceptor client. The Interceptor client fetches the original destination IP address and the remote port using the SOCKS protocol. Then it transfers this information to the Interceptor server, which opens a TCP/IP connection with the server application using this IP address and remote port. If the Interceptor server fails to open the connection with the server application, the Interceptor client closes the connection with the client application.

All data sent by the client application over a TCP/IP connection is forwarded by the Interceptor client via the communication platform to the Interceptor server, which sends it to the corresponding server application.

All data sent by the server application over a TCP/IP connection is forwarded by the Interceptor server via the communication platform to the Interceptor client, which sends it to the corresponding client Application.

When the client or the server application closes a TCP/IP connection, the Interceptor will close the connection with its counterpart.

The proposed interception mechanism also addresses the problem of name resolution. Typically the actual name resolution is provided by so-called "domain name services" (DNS). Most available SOCKS clients handle only TCP/IP traffic. This is a problem, because the client applications might use domain name resolution (DNS, see RFC 1101) to obtain an IP address of the host of a server application. DNS uses UDP.

For this reason the present invention may implement the Interceptor such that it also acts as a domain name server. Every name resolution request it receives from a client application is forwarded to an Interceptor server, which again forwards it to a real domain name server. For each request the Interceptor server forwards it uses a different local UDP port, so the answers of the real domain name server can be assigned to the requesting clients. The Interceptor server sends those answers back to the correct Interceptor client, which forwards them to the originator (i.e. the client application). The system-wide domain name server address of the client system must be configured to be "localhost" (IP address 127.0.0.1), in order to support DNS over Interceptor.

Compensation Functionalities of the Interceptor

As already explained above the preferred embodiment of the current invention intercepts the SOCKS protocol by the client and server Interceptors. SOCKS is a protocol that relays TCP sessions at a firewall host to allow application users transparent access across the firewall. Because the protocol is independent of application protocols, it can be (and has been) used for many different services, such as telnet, ftp, finger, whois, gopher, WWW, etc. The server simply relays the data between the client and the application server, incurring minimum processing overhead. Since SOCKS never has to know anything about the application protocol, it should also be easy for it to accommodate applications which encrypt traffic.

Instead of communicating with the SOCKS server, in the preferred embodiment of the current invention the SOCKS client communicates with the Interceptor client running on the mobile device. All data the Interceptor client receives from the SOCKS client will be sent to the Interceptor server using the communication platform. The tasks normally done by the SOCKS server are now done by the Interceptor client and Interceptor server.

Figure 6:
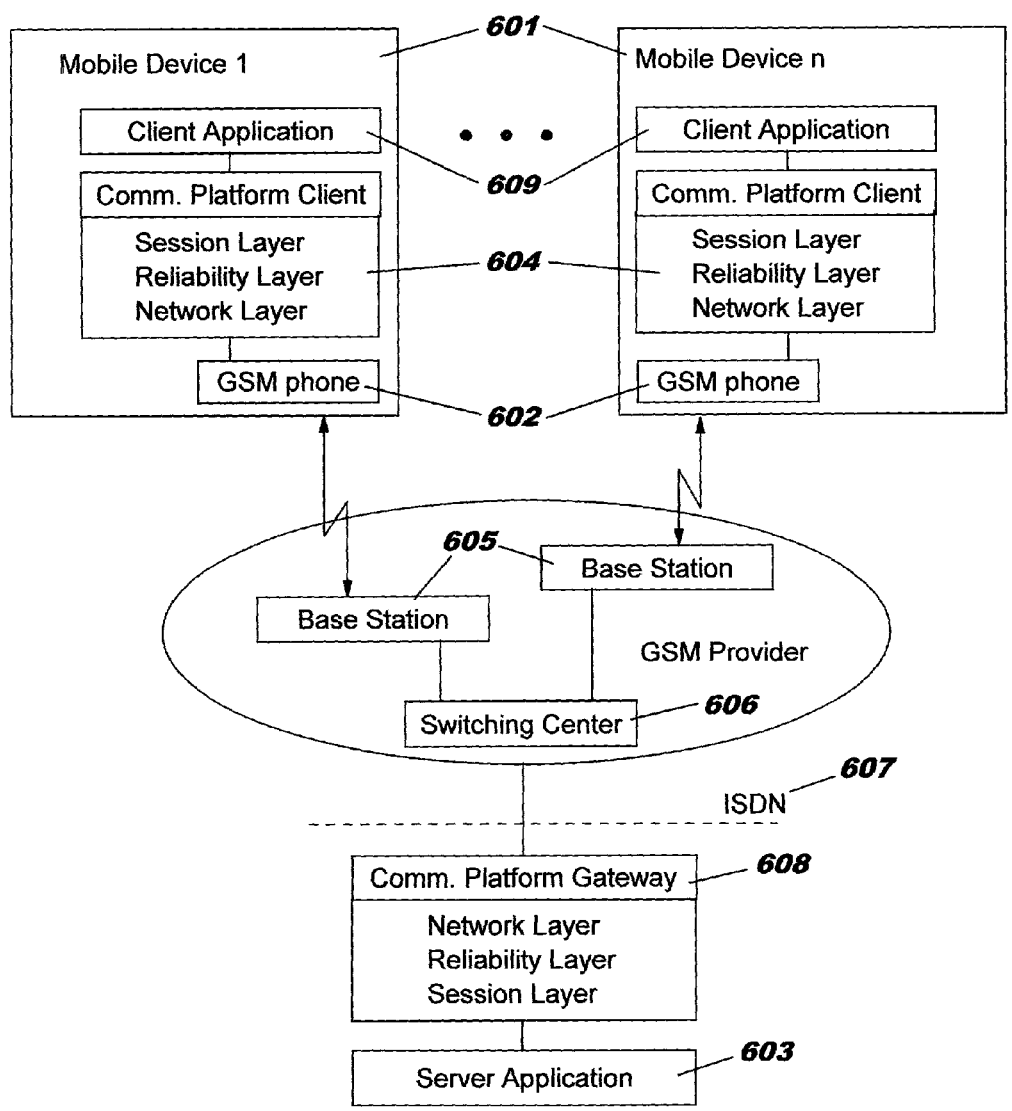
FIG. 6 shows a typical GSM network according to the state of the art wherein a mobile phone is connected to the server application.

FIG. 6 depicts a typical GSM network according to the state of the art wherein mobile devices 601 exploit mobile phones 602 to connect to a server application 603. The client network layer 604 uses a GSM phone 602 to physically connect to the gateway network layer. The GSM phone connects to a base station 605 of the GSM network provider and the switching center 606 of the provider connects via ISDN 607 to the gateway network layer 608 (using the V.110 protocol).

If the Interceptor technology as described above were to be introduced within this exemplary environment, within each of the mobile devices 601 a client Interceptor would be embodied between the client applications 609 and the communication platforms 604; and a server Interceptor would be embodied between the server application 603 and the communication platform gateway 608.

In such an example environment enhanced with the proposed Interceptor technology, the cooperation of the client Interceptors and the server Interceptors would achieve significant advantages by successfully dealing with the following problem situations:

1. Crash Recovery

Physical connections over GSM networks may be interrupted at any time due to a loss of radio coverage. This will happen frequently when the mobile device is moving substantially. The Interceptor technology would compensate this deficiency: every time a network layer has to send some data and there is no physical connection in place, it tries to set up a new physical connection with its peer. The attempt to set up a connection is repeated until it is successful or the logical connection is closed by the session layer because the reliability layer has detected a session timeout.

2. Shorthold Mode

The Interceptor technology in place will close idle physical connections to reduce costs and to reduce the effort to administer unused connections. As soon as the reliability layer passes new data, the connection will be set up again. Thus the Interceptor approach allows to compensate efficiency deficiencies of the underlying protocol.

3. Establishing a New Connection

When a TCP-based client wishes to establish a connection to an application server, the SOCKS client first attempts to open a TCP connection to the Interceptor client. If the connection request succeeds, the SOCKS client sends a version identifier/method selection message. The Interceptor client sends a METHOD selection message to the SOCKS client saying "NO AUTHENTICATION REQUIRED". After that the SOCKS client sends a CONNECT request to the Interceptor client containing the destination address and destination port. The Interceptor client evaluates the request and sends a reply message saying "SUCCEEDED" to the SOCKS client.

Moreover, the Interceptor client sends an Open request packet over the Radio Network using the communication platform to the Interceptor server. This Open request packet contains the destination address, destination port and a client connection identifier (client conn id). The Interceptor server establishes a TCP connection to the application server using the given destination address and destination port. This TCP connection is associated with the given client connection identifier and the client identifier (client id).

4. Closing a Connection

The application client as well as the application server may close a connection. In the first case the Interceptor client sends a Close request packet using the communication platform to the Interceptor server, which then closes the TCP connection to the application server. In the second case the Interceptor server sends a Close request packet using the communication platform to the Interceptor client, which then closes the TCP connection to the application client.

5. Transferring Data

The data originated by the client application is sent to the Interceptor client. The Interceptor client adds the client connection identifier to the data before sending it to the Intercept server. With the information of the client connection identifier the Interceptor server decides over which TCP connection the data have to be sent to the appropriate application server.

The data originated by the server application is transmitted to the Interceptor server over the existing TCP connection. The Interceptor server adds the client connection identifier for that TCP connection to the data. On the other hand the Interceptor server knows the client identifier (client id) for the TCP connection and can send the data to the Interceptor client. With the information of the client connection identifier the Interceptor client decides over which TCP connection the data have to be sent to the appropriate application client.

6. Insufficient Transmission Capacity

If the Interceptors determine that the capacity (that is the band width) of the connection is not sufficient to process a transmission request within a certain time frame, the client Interceptor and the server Interceptor may decide to establish additional connections between both in parallel. Due to the multitude of parallel connections providing additional transmission capabilities the Interceptors are now able to perform the transmission within a significantly shorter time frame.

7. Multiplexing Multitude of Connections

Figure 7:
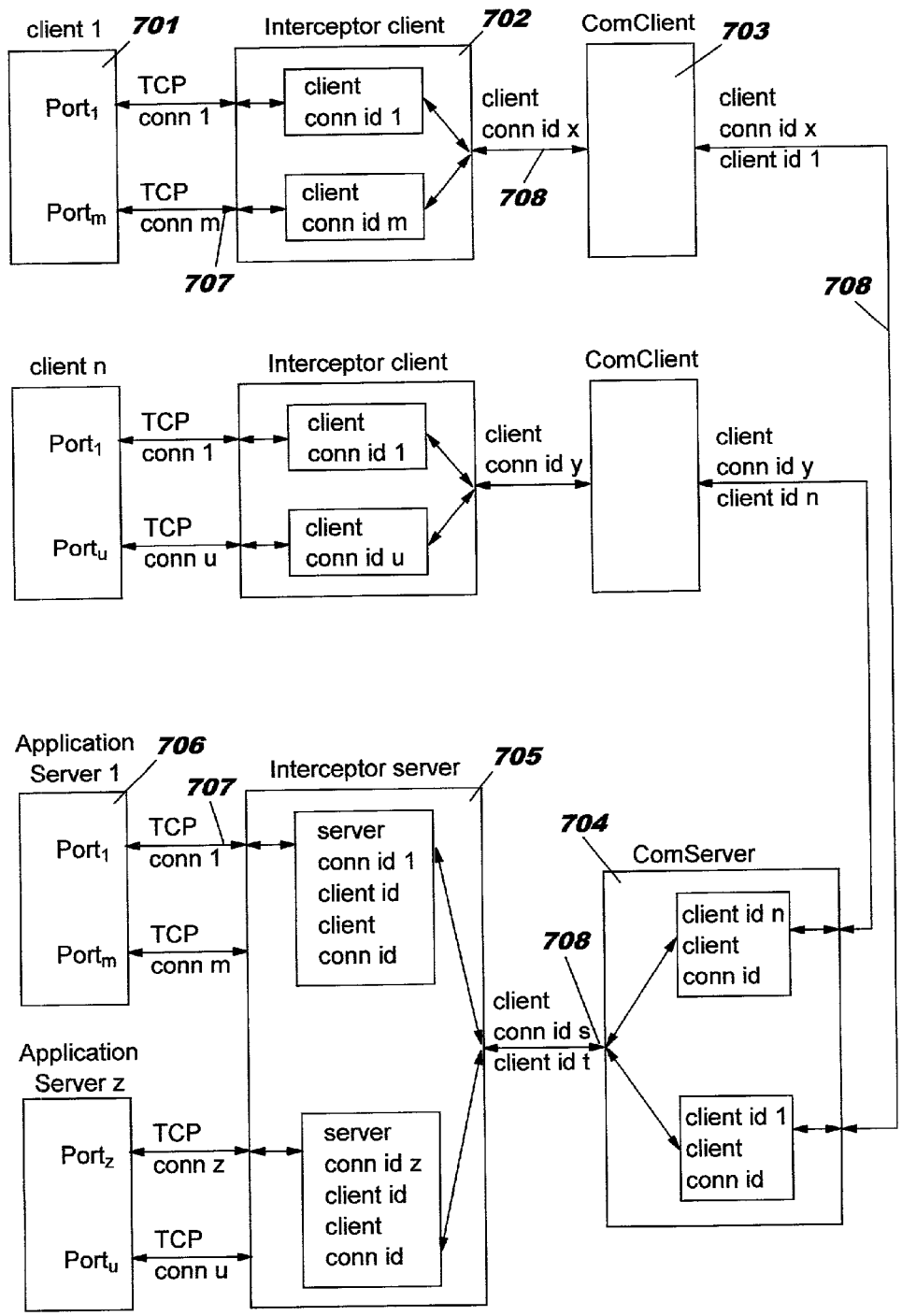
FIG. 7 shows how the Interceptor approach can be exploited to multiplex a multitude of parallel connections over a single connection.

FIG. 7 shows how the Interceptor approach can be exploited to multiplex a multitude of parallel connections over a single connection. Referring to FIG. 7, the client application 701 communicates via a client Interceptor 702, a communication platform 703 on the client system, a communication platform 704 on the server system, with a server Interceptor 705 to the server application 706. As can be seen from FIG. 7 the client Interceptor and the server Interceptor can be used to multiplex a multitude of parallel connections 707 over and a single connection 708. With this Interceptor functionality exploitation of the underlying protocol can be optimized in terms of efficiency and costs.

We claim:

1. A data communication method that compensates for disadvantageous characteristics of a first protocol that is used to communicate data between a client application and a server application, wherein the client application and the server application employ a second protocol that is mapped onto the first protocol, said method comprising the acts of:

intercepting, by a client interceptor acting on behalf of a server application, a second-protocol data communication request from a client application;

mapping, by the client interceptor, the second-protocol data communication request onto the first protocol;

sending the communication request to a server interceptor using the first protocol;

compensating a disadvantageous characteristic of the first protocol, said compensating comprising ascertaining that a condition exists and eliminating the condition in response to said ascertaining, said condition being a connection condition or a transmission capacity condition;

mapping, by the server interceptor, the communication request back onto the second protocol to recreate substantially the second-protocol data communication request;

delivering the second-protocol data communication request to the server application; and after said intercepting the communication request and before said sending the communication request to the server interceptor: adding, by the client interceptor, a client connection identifier to the communication request.

2. The method of claim 1, wherein the ascertaining comprises determining loss of a connection, and wherein the eliminating comprises re-establishing the connection.

3. The method of claim 1, wherein the ascertaining comprises detecting that a connection is idle, and wherein the eliminating comprises dropping the connection and re-establishing the connection when a new communication request is intercepted.

4. The method of claim 1, wherein the ascertaining comprises determining that transmission capacity is insufficient to process the data communication request within a predetermined interval of time, and wherein the eliminating comprises establishing a parallel connection to increase transmission capacity.

5. The method of claim 1, wherein the second protocol is connection oriented, and wherein the client interceptor and the server interceptor intercept a plurality of connections between the client application and the client interceptor using the second protocol, and between the server interceptor and the server application using the second protocol.

6. The method of claim 5, wherein the plurality of connections using the second protocol are multiplexed onto a single connection of the first protocol.

7. The method of claim 1, wherein the first protocol is a wireless communication protocol.

8. The method of claim 1, further comprising the act of opening, by the client interceptor, a connection to the server interceptor using the first protocol following the act of intercepting the second-protocol data communication request.

9. The method of claim 1, further comprising the acts of:
opening, by the client interceptor, a connection to the server interceptor using the first protocol following the act of intercepting the second-protocol data communication request; and
receiving, by the client interceptor, an identification of the server application; and
forwarding the identification to an address-resolution server for first-protocol address resolution.

10. The method of claim 1, wherein said compensating further comprises closing idle connections to reduce costs.

11. A data communication system that compensates for disadvantageous characteristics of a first protocol that is used to communicate data between a client application and a server application, wherein the client application and the server application employ a second protocol that is mapped onto the first protocol, said system comprising:

a client interceptor acting on behalf of the server application, said client interceptor adapted to intercept a second-protocol data communication request from the client application, said client interceptor further adapted to map the second-protocol data communication request onto the first protocol;

a server interceptor adapted to map the communication request back onto the second protocol to recreate substantially the second-protocol data communication request;

means for sending the second-protocol data communication request to the server interceptor using the first protocol;

means for compensating a disadvantageous characteristic of the first protocol, said compensating comprising ascertaining that a condition exists and eliminating the condition in response to said ascertaining, said condition being a connection condition or a transmission capacity condition;

means for delivering the second-protocol data communication request to the server application; and means for adding, by the client interceptor, a client connection identifier to the communication request after said client interceptor has intercepted the communication request and before the communication request has been sent to the server interceptor.

12. The system of claim 11, wherein the ascertaining comprises determining loss of a connection, and wherein the eliminating comprises re-establishing the connection.

13. The system of claim 11, wherein the ascertaining comprises detecting that a connection is idle, and wherein the eliminating comprises dropping the connection, and re-establishing the connection when a new communication request is intercepted.

14. The system of claim 11, wherein the ascertaining comprises the acts of determining that transmission capacity is insufficient to process the data communication request within a predetermined interval of time, and wherein the eliminating comprises establishing a parallel connection to increase transmission capacity.

15. The system of claim 11, wherein the second protocol is connection oriented, and wherein the client interceptor and the server interceptor are adapted to intercept a plurality of connections between the client application and the client interceptor using the second protocol, and between the server interceptor and the server application using the second protocol.

16. The system of claim 15, wherein the plurality of connections using the second protocol are multiplexed onto a single connection of the first protocol.

17. The system of claim 11, wherein the first protocol is a wireless communication protocol.

18. The system of claim 11, further comprising:
means for opening, by the client interceptor, a connection to the server interceptor using the first protocol following intercepting the second-protocol data communication request.

19. The system of claim 18, further comprising:
means for receiving, by the client interceptor, an identification of the server application; and
means for forwarding the identification to an address-resolution server for first-protocol address resolution.

20. The system of claim 11, wherein said means for compensating further comprises means for closing idle connections to reduce costs.

21. A data communication method that compensates for disadvantageous characteristics of a first protocol that is used to communicate data between a client application and a server application, wherein the client application and the server application employ a second protocol that is mapped onto the first protocol, said method comprising the acts of:

intercepting by a client interceptor acting on behalf of a server application, a second-protocol data communication request from a client application;

mapping by the client interceptor, the second-protocol data communication request onto the first protocol;

sending the communication request to a server interceptor using the first protocol;

compensating a disadvantageous characteristic of the first protocol, said compensating comprising ascertaining that a condition exists and eliminating the condition in response to said ascertaining, said condition being a connection condition or a transmission capacity condition;

mapping, by the server interceptor, the communication request back onto the second protocol to recreate substantially the second-protocol data communication request; and delivering the second-protocol data communication request to the server application, wherein the client application resides on a computing device, wherein the computing device comprises a communication platform client that includes a session layer, a reliability layer, and a network layer, and wherein in response to the network layer attempting to send data with no physical connection in place for sending the data said method comprises: repeatedly attempting to set up a new physical connection until either the new physical connection is set up or until a logical connection is closed by the session layer in response to the reliability layer having detected a session timeout.

22. A data communication system that compensates for disadvantageous characteristics of a first protocol that is used to communicate data between a client application and a server application, wherein the client application and the server application employ a second protocol that is mapped onto the first protocol, said system comprising:

a client interceptor acting on behalf of the server application, said client interceptor adapted to intercept a second-protocol data communication request from the client application, said client interceptor further adapted to map the second-protocol data communication request onto the first protocol;

a server interceptor adapted to map the communication request back onto the second protocol to recreate substantially the second-protocol data communication request:

means for sending the second-protocol data communication request to the server interceptor using the first protocol;

means for compensating a disadvantageous characteristic of the first protocol, said compensating comprising ascertaining that a condition exists and eliminating the condition in response to said ascertaining, said condition being a connection condition or a transmission capacity condition; and means for delivering the second-protocol data communication request to the server application, wherein the client application resides on a computing device, wherein the computing device comprises a communication platform client that includes a session layer, a reliability layer, and a network layer, wherein in response to the network layer attempting to send data with no physical connection in place for sending the data said system comprises: means for repeatedly attempting to set up a new physical connection until either the new physical connection is set up or until a logical connection is closed by the session layer in response to the reliability layer having detected a session timeout.

* * * * *